April 12, 1966     C. D. CHANG     3,245,777
METHOD OF MAKING PHOSPHATE FERTILIZER
Filed Jan. 10, 1963
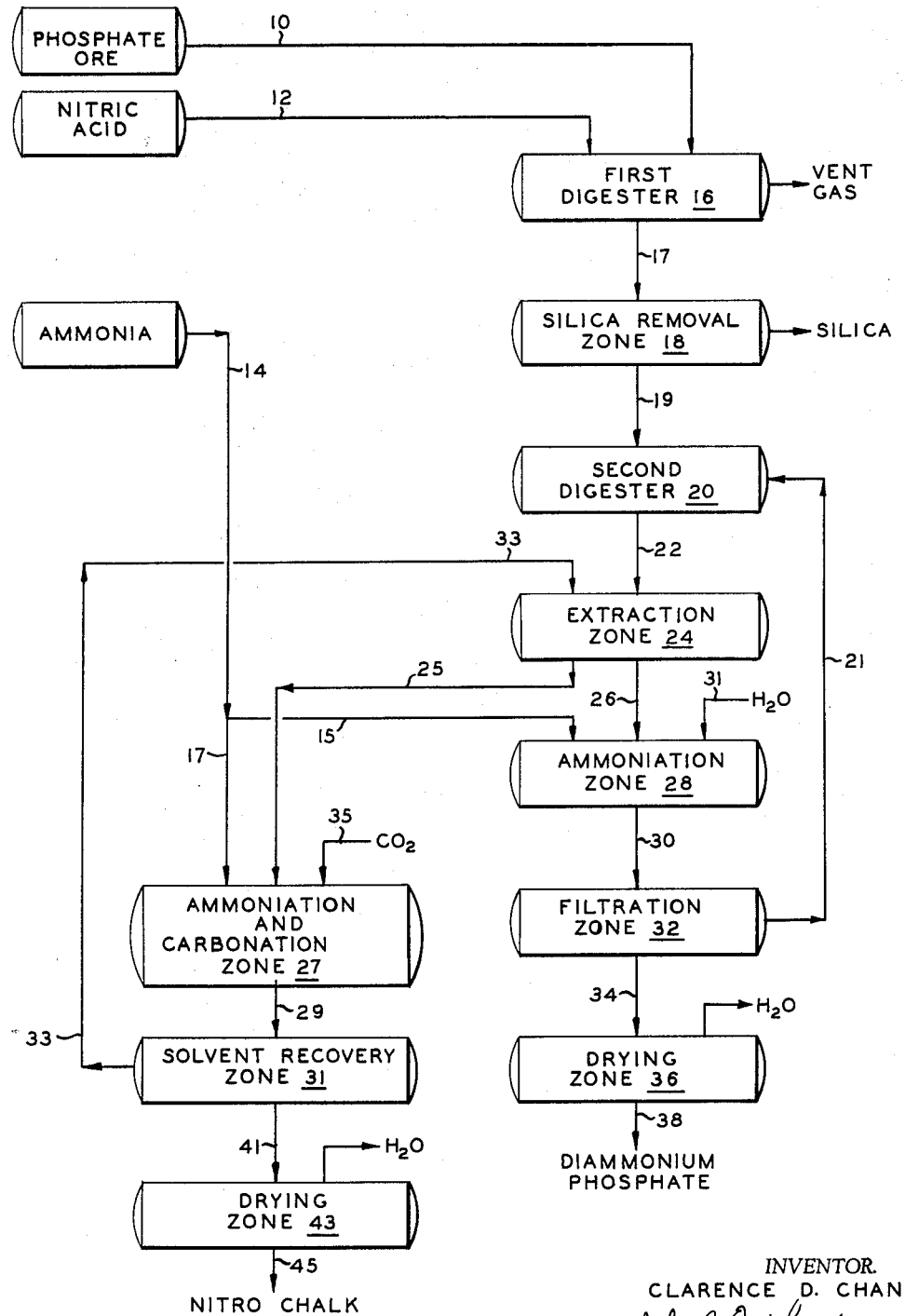
INVENTOR.
CLARENCE D. CHANG
BY John C. Quinken
ATTORNEY United States Patent Office 3,245,777
Patented Apr. 12, 1966

3,245,777
METHOD OF MAKING PHOSPHATE FERTILIZER
Clarence D. Chang, Brooklyn, N.Y., assignor to Pullman Incorporated, a corporation of Delaware
Filed Jan. 10, 1963, Ser. No. 250,531
6 Claims. (Cl. 71—39)

The present invention relates to the production of phosphate fertilizers, and more particularly, to the production of water soluble phosphate fertilizers from a calcium phosphate salt. Still more particularly, it relates to a process for making an ammonium phosphate salt, useful in agronomical applications, as a completely water soluble fertilizer, utilizing comminuted phosphate rock ore and nitric acid as starting materials.

In the art of the production of plant fertilizers, it is well known to digest finely ground phosphate rock ore with a strong mineral acid to recover the $P_2O_5$ value of such rock in the form of monobasic calcium phosphate or as phosphoric acid, while producing a corresponding calcium salt of the mineral acid as a by-product of the reaction. In this respect, it is known that the treatment of phosphate rock ore with nitric acid, in particular, offers as an advantage the introduction of the nitrate, itself, which is a valuable plant nutrient, whereas, by way of comparison, calcium sulfate formed in the use of sulfuric acid as a digestant is neither a plant nutrient nor an economically recoverable form of sulfur. On the other hand, the presence of the nitrate in the form of calcium nitrate constitutes a problem in that the calcium nitrate is extremely hydroscopic and imparts undesirable characteristics to the fertilizer product, such as, for example, the tendency toward agglomeration or caking.

Several approaches to the problem of the presence of calcium nitrate in the fertilizer product where nitric acid is used to acidulate phosphate rock ore have been explored in the past. According to one prior method, calcium nitrate is converted into an insoluble calcium salt and ammonium nitrate, which conversion is accomplished by one of several methods including the use of a mixed acid such as a nitric-sulfuric mixture, the addition of a foreign salt such as ammonium sulfate, or the use of ammoniation followed by carbonation. According to another prior method, attempts have been made to physically separate calcium nitrate from phosphoric mixtures by fractional crystallization.

Unfortunately, however, the recovery of a completely water-soluble phosphate product free from substantial percentages of salts other than phosphate is not possible utilizing the known processes.

It is therefore an object of the present invention to produce a completely water-soluble phosphate salt completely free of the extremely hygroscopic constituents which is useful for agronomical applications.

Another object of the present invention is to produce a method for separating calcium nitrate from phosphatic material.

Another object of the present invention is to provide a method for producing monobasic phosphate of substantial purity from which substantially all of the calcium nitrate has been removed.

A further object of the present invention is to produce substantially pure diammonium phosphate.

Still another object of the present invention is to produce diammonium phosphate of substantial purity substantially free of calcium nitrate in a commercially feasible and economical process.

A still further object is to provide an economical process for the recovery of the $P_2O_5$ value contained in phosphate rock ore utilizing nitric acid as the digesting material.

Further objects and advantages of the present invention will become apparent to those skilled in the art from the following description and disclosure.

The objects are generally accomplished in accordance with the present invention by providing a mixture containing monobasic calcium phosphate and a calcium salt of a suitable strong acid and separating the calcium salt from the mixture. In accordance with one aspect of the present invention, a mixture containing calcium nitrate and monobasic calcium phosphate is provided; and then the calcium nitrate is separated from this mixture by extraction with a selected solvent.

The abovementioned mixture is provided, in accordance with another aspect of the present invention, by the acidulation of a phosphatic substance with a controlled proportion of nitric acid to produce a slurry containing monobasic calcium phosphate salt and calcium nitrate. A selected solvent is then admixed with the slurry to extract calcium nitrate and thereby produce purified monobasic calcium phosphate which is suitable for utilization as a superphosphate fertilizer or for further treatment with a strongly basic substance, e.g., ammonia, to produce a corresponding fertilizer salt.

Generally, the proportion of a strong acid employed in the acidulation of a phosphatic substance is controlled to provide a mixture containing monobasic calcium phosphate and the corresponding calcium salt of the strong acid for a subsequent extraction step. The proportion of acid is thus limited to avoid the presence of free phosphoric acid which is produced when excess nitric acid is employed in the acidulation. By avoiding the presence of free phosphoric acid in the extraction step, the co-extraction of $P_2O_5$ values with the corresponding calcium salt is thereby minimized. Although it is desirable, ultimately, to provide a mixture of monobasic calcuim phosphate salt and the corresponding calcium salt to the extraction step, it is expedient in the practice of the present invention when a phosphatic substance such as, for example, phosphate rock ore is employed as the starting material initially to convert the $P_2O_5$ value of the starting material to free phosphoric acid by acidulating such starting material with excess strong acid, such as nitric acid. Impurities and insolubles originally present in the ore can then be separated from the acid phase; the $N_2O_5/P_2O_5$ mol ratio in the acid phase is thereafter adjusted to provide a slurry containing monobasic calcium phosphate salt and the corresponding calcium salt for further treatment by extraction in accordance with the present invention.

By way of definition, the term "phosphatic substance" or "phosphatic material," when employed in the specification and claims of the present application, is intended to include dibasic calcium phosphate ($CaHPO_4$), tricalcium phosphate ($Ca_3(PO_4)_2$), monobasic calcium phosphate ($Ca(H_2PO_4)_2$), also called superphosphate, free phosphoric acid, phosphate rock ore and any other suitable derivatives of phosphorus treated in accordance with the phesent invention. The term "$N_2O_5/P_2O_5$," when employed in the present application, is intended as a mol ratio of reactive constituents in a mixture of nitric acid and a phosphatic substance.

Although the present invention can be employed in the production of useful fertilizer salts from any suitable phosphatic substance, phosphate rock ore is ordinarily the starting material which is available for the commercial production of phosphate fertilizers. For this reason, the remaining description refers to the treatment of phosphate rock ore. Although such ores differ in their precise composition, they generally contain CaO present as tricalcium phosphate and calcium carbonate, $P_2O_5$ present as tricalcium phosphate and siliceous, as well as others impurities.

Where the acidulation is carried out with nitric acid, in order to provide a mixture comprising monobasic calcium phosphate salt and to convert the remaining calcium in the ore to calcium nitrate, it is necessary to adjust the $N_2O_5/P_2O_5$ ratio to a suitably limited level which is fixed by stoichiometric considerations. If the $N_2O_5/P_2O_5$ exceeds that which is required in accordance with the stoichiometry of any given situation, at least a portion of the $P_2O_5$ value in the mixture is converted to free phosphoric acid, which is co-extracted or carried over with calcium nitrate in the subsequent extraction step, thus reducing the yield of phosphate salt. In the production of superphosphate fertilizers by the acidulation of phosphate rock ore using a once-through process, i.e., a no recycle process, for example, the $N_2O_5/P_2O_5$ ratio dictated by stoichiometric considerations must be maintained at not more than $(2+X)$, where X represents the mols of CaO in excess of CaO originally present as tribasic phosphate salt in the ore. If a ratio greater than that calculated in accordance with the aforementioned formula is employed, free phosphoric acid is produced. In the production of fertilizer salts derived from the reaction of strongly basic substances and monobasic calcium phosphate such as, for example, in the production of ammonium phosphate, which will be described in greater detail later herein, dibasic calcium phosphate is produced in the ammoniation step, in addition to the production of diammonium phosphate. It is preferable, in certain applications, to recycle such dibasic calcium phosphate for further acidulation and by reason of the recycled material, the stoichiometric requirements of the system are changed. The $N_2O_5/P_2O_5$ ratio in this case is maintained at not more than $(1.5+X)$, where X represents the mols of CaO in excess of the quantity of CaO originally present as tribasic phosphate salt in the ore in order to provide the mixture of monobasic calcium phosphate salt and calcium nitrate and to avoid free phosphoric acid production. It is thus apparent that it is an important part of the present invention to provide a mixture of monobasic calcium phosphate salt and calcium nitrate for subsequent extraction of the calcium nitrate therefrom and thus to avoid or minimize the presence of free phosphoric acid in the extraction step; that the $N_2O_5/P_2O_5$ ratio is an important variable in providing the aforementioned mixture; and that such a mixture can be provided in any given case in accordance with the methods outlined herein.

It is a very important part of the present invention, having provided a mixture containing monobasic calcium phosphate and calcium nitrate to treat such mixture with a selected solvent to extract calcium nitrate therefrom thereby producing a purified phosphate salt. Generally, such a solvent is selected on the basis of its ability to extract calcium nitrate while co-extracting a minimal amount of $P_2O_5$ values from the aforementioned salt mixture. Several groups of organic solvents have been found to be useful in carrying out such an extraction, such as lower alcohols and lower ketones. In particular, methanol, ethanol, isopropanol, acetone and methyl ethyl ketone, have been found to be extremely well suited to the purposes of the present invention. It is contemplated that alcohols containing up to 6 carbon atoms can be successfully employed. It has also been observed that co-extraction of $P_2O_5$ values increases as the percentage of water contained in the system is increased. On the other hand, it has been noticed that it is preferable to conduct the acidulation reaction on the phosphatic feed in the presence of a substantial percentage of water, for one reason, to reduce the viscosity of the product mixture obtained from such reaction. It is thus desirable to balance these interests in any given case in order to arrive at an optimum water content.

The invention hereinabove set forth in general terms is widely applicable in the production of phosphate fertilizers including the production of superphosphates and derivatives thereof obtained by the reaction of strongly basic substances, such as, for example, ammonia, solutions containing the same, potassium hydroxide, basic solutions of potassium, and mixtures of the aforementioned solutions. Fertilizer compounds having a high purity and substantially free of calcium nitrate can be produced in accordance with the present invention in a commercially attractive fashion; and, as an additional advantage, nitrate values separated in the extraction step can be effectively transformed and recovered as useful fertilizer salts and their mixtures in the practice of the present invention.

The present invention is particularly well suited for the production of diammonium phosphate of high purity, suitable for any use including agronomical application, employing phosphate rock ore, nitric acid and ammonia as starting materials. As an important feature of the same process, the calcium nitrate produced as a result of acidulating the ore can be separately treated to recover the nitrate value thereof in the form of less hydroscopic ammonium nitrate or as nitrochalk mixtures. The overall reactions in this process are set out below. It should be noticed that in the reaction which appear below, the ore is denoted by the formula for tricalcium phosphate, the practical consideration of impurities being discussed later herein. These reactions are:

(1) $\frac{1}{2}Ca_3(PO_4)_2 + CaHPO_4 + 3HNO_3$
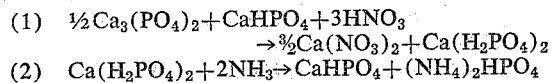
$\rightarrow \frac{3}{2}Ca(NO_3)_2 + Ca(H_2PO_4)_2$ (2) $Ca(H_2PO_4)_2 + 2NH_3 \rightarrow CaHPO_4 + (NH_4)_2HPO_4$ Where the presence of impurities in the phosphate rock ore can be disregarded, such as when a relatively pure tricalcium phosphate ore is available, a $N_2O_5/P_2O_5$ ratio not exceeding 1.5 is dictated by the stoichiometry of Reaction 1 to avoid free phosphoric acid production. It should be noticed that Reaction 1 constitutes the preferred method of operation of this invention wherein the dibasic calcium phosphate is present. It is possible, however, to operate the process without recycling the dibasic calcium phosphate, although such is not preferred, in which case the stoichiometry of Reaction 1 is changed. The $N_2O_5/P_2O_5$ ratio must not exceed 2, again disregarding impurities, for this case.

It is important, in the practice of the present process, that calcium nitrate be removed from the product mixture obtained from Reaction 1 prior to the ammoniation step illustrated in Reaction 2 for, in the presence of calcium nitrate, the reversion of phosphate to an insoluble form occurs as follows:

(3) $\frac{3}{2}Ca(NO_3)_2 + Ca(H_2PO_4)_2 + 2NH_3 \rightarrow$
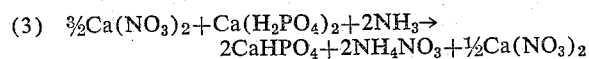
$2CaHPO_4 + 2NH_4NO_3 + \frac{1}{2}Ca(NO_3)_2$ The extraction step is thus carried out subsequent to an acidulation reaction, such as Reaction 1, and prior to an ammoniation reaction, such as Reaction 2, in accordance with the present invention, whereby a selected solvent such as, for example, a lower alcohol or a lower ketone, as hereinbefore set forth, is admixed with a salt mixture or slurry containing calcium nitrate and monobasic calcium phosphate. A bi-phase system results which consists of a liquid extract phase, which contains dissolved calcium nitrate, and a solid phase, which contains monobasic calcium phosphate. When the phases are separated, purified monobasic calcium phosphate remains as a solid residue purified with respect to calcium nitrate; the extract phase is passed, preferably, to further treatment for the recovery of the nitrate values contained therein. The residue is further treated with ammonia, a mixture comprising the same or with another suitably strongly basic substance to convert at least a portion of the monobasic calcium phosphate contained in the residue to diammonium phosphate or to a corresponding phosphate salt of the basic reactant. Dibasic calcium phosphate is produced along with the ammonium phosphate in the ammoniation of monobasic calcium phosphate. The dibasic phosphate is preferably separated, e.g., by filtration and recycled to an acidulation step; and the diammonium phosphate is recovered, e.g., by a drying step or other suitable recovery methods.

As was previously hereinabove mentioned, the phosphate rock ore which is ordinarily available as the starting material contains impurities such as, for example, organic matter, bound fluorine, calcium carbonate and siliceous material, in addition to tricalcium phosphate. Provision is preferably made for the removal of at least a portion of such impurities prior to the extraction step. Certain of these impurities can be removed by calcination of the ore prior to acidulation. It has been found, however, that other impurities such as the siliceous material are effectively removed by conducting the acidulation of the ore in at least two steps, and providing means for separating insolubles and siliceous material between such steps. Accordingly, nitric acid employed in the acidulation reaction is admixed with comminuted phosphate ore in a first digestion zone, the nitric acid being introduced in a proportion in excess of that which is required for the reaction of the calcium content of the ore in order to produce a liquid phase, containing phosphoric acid and dissolved calcium nitrate, and a solid phase, containing siliceous material and other material which is insoluble in the resultant acid solution. The following reaction takes place in the first digestion zone:

(4) $\frac{1}{2}Ca_3(PO_4)_2 + 3HNO_3 \rightarrow \frac{3}{2}Ca(NO_3)_2 + H_3PO_4$ The insolubles are separated from the acid phase by any suitable method such as, for example, filtration, centrifugation, settling; and the acid phase is then passed to a second digestion zone. In the second digestion zone, the $N_2O_5/P_2O_5$ ratio of the acid phase is adjusted in accordance with stoichiometric requirements to convert the $P_2O_5$ and $N_2O_5$ values thereof to a mixture of monobasic calcium phosphate and calcium nitrate salts. Although any siutable method may be employed to adjust the $N_2O_5/P_2O_5$ ratio, a preferred method comprises introducing recycled dibasic calcium phosphate to the second digestion zone such that the following reaction occurs:

(5) $\frac{3}{2}Ca(NO_3)_2 + H_3PO_4 + CaHPO_4 \rightarrow$
$\frac{3}{2}Ca(NO_3)_2 + Ca(H_2PO_4)_2$ Where the dibasic calcium phosphate produced in ammoniation Reaction 2, which is set out above, is recycled to a suitable digestion zone, the $N_2O_5/P_2O_5$ ratio should be maintained at not more than $(2+X)$, where X represents the mols of CaO in excess of the quantity of CaO originally present as tribasic calcium phosphate in the ore. In the practice of the present invention, however, it has been found by reason of the equilibrium set out in Equation 6 below which occurs in the presence of water, phosphoric acid and dibasic calcium phosphate are formed in limited quantities in accordance with the extent of the equilibrium during the extraction step:

(6) $Ca(H_2PO_4)_2 \rightarrow CaHPO_4 + H_3PO_4$

The phosphoric acid which is produced in the equilibrium reaction above, is co-extracted and carried over into the extract phase thereby leaving a net quantity of dibasic calcium phosphate admixed with monobasic calcium phosphate in the solid phase residue from the extraction. Such dibasic calcium phosphate is preferably recycled with the calcium phosphate which is produced in the ammoniation reaction thereby effecting a change in the stoichiometric balance in the second digestion zone. As the amount of phosphoric acid which is co-extracted in the extraction step is increased and the amount of dibasic calcium phosphate is increased, the $N_2O_5/P_2O_5$ ratio in the second digestion zone is accordingly reduced. Although reference is made to the adjusting of the $N_2O_5/P_2O_5$ ratio in a second digestion zone for the purposes of illustration, the principles set forth with respect to such second digestion zone, are intended to apply to any digestion zone situated in a process immediately upstream with respect to the extraction step of the present invention.

Where the phosphoric acid co-extracted in the solvent phase is excessive for reasons which include the presence of a high percentage of water in the system or choice of solvent, the extract phase containing such phosphoric acid is preferably treated with ammonia in order to precipitate the $P_2O_5$ value thereof as dibasic calcium phosphate, such precipitate being then separated from the remaining extract liquor and being recycled to an acidulation step, as previously described. The extract or solvent phase obtained either from the aforementioned extraction step or from the ammoniation treatment mentioned immediately above is preferably treated to recover the nitrate values which are contained therein as fertilizers, such as ammonium nitrate and nitrochalk. The recovery of such nitrate mixtures constitutes an extremely important advantage which accures in the production of diammonium phosphate via a nitric-phosphate process as opposed to the production of the same feltilizer employing other strong acids as a starting material.

In regard to the ammoniation of monobasic calcium phosphate which is obtained in a purified condition with regard to calcium nitrate in accordance with the present process, the ammoniation reaction which takes place at about ambient temperature is set forth above in Reaction 2. It has been observed, however, that a 1/3 increase in stoichiometric yield of diammonium phosphate obtains when the ammoniation reaction is carried out under an elevated temperature, preferably about 100° and 200° C., in accordance with the following reaction:

(7) $Ca(H_2PO_4)_2 + \frac{2}{3}NH_3 \rightarrow$
$\frac{1}{3}Ca_3(PO_4)_2 + 1\frac{1}{3}(NH_4)_2HPO_4$ The tricalcium phosphate to which the monobasic calcium phosphate reverts under the aforementioned conditions is recycled, preferably, for further acidulation. In regard to the recovery of diammonium phosphate from dibasic calcium phosphate formed in an ammoniation reaction, the following procedure is observed. Water is introduced in suitable quantities to the ammoniation zone in order to dissolve diammonium phosphate formed therein. Since dibasic calcium phosphate is insoluble in the aqueous medium, it can be separated from the effluent derived from the ammoniation zone by any suitable method such as, for example, filtration, settling and centrifugation, and recycled as previously mentioned. The diammonium phosphate contained in the filtrate is recovered by drying, according to known methods. In the practice of the present invention, however, it has been discovered that ammonium phosphates can be precipitated from aqueous solutions by the addition of ammonia in proportion to the solution such that the total $NH_3:P_2O_5$ ratio is at least about 4:1 and preferably in excess of about 4:1. Such discovery provides an advantageous method for recovering diammonium phosphate without resorting to the aforementioned drying step. By way of illustration, 1 mol of $Ca(H_2PO_4)_2$ is treated with aqueous $NH_3$ containing 2 mols of $NH_3$ and sufficient water to dissolve the $(NH_4)_2HPO_4$ which is formed. $CaHPO_4$ is removed for recycle purposes by filtration and the filtrate is treated with 2 mols of gaseous $NH_3$ causing ammonium phosphate to precipitate. The precipitated ammonium phosphate is separated by filtration, and resultant filtrate, containing 2 mols of $NH_3$ and a low concentration of ammonium phosphate is recycled to treat fresh $(Ca(H_2PO_4)_2$.

Another modification which is contemplated for use in the extraction step of the present invention involves employing liquid ammonia as a solvent to extract calcium nitrate. Such an extraction eliminates phosphoric acid co-extraction by virtue of the insolubility of phosphates in liquid ammonia. It should, furthermore, be understood that the process of the present invention can be adapted for the production of diammonium phosphate starting with phosphate rock ore which is acidulated with hydrochloric acid. By adjusting the $HCl/P_2O_5$ ratio in accordance with the stoichiometric requirements, a mixture containing monobasic calcium phosphate and calcium chloride is provided. That is to stay, by reacting a limited proportion of hydrochloric acid and a phosphatic substance, the production of phosphoric acid is avoided and the aforementioned mixture of salts is provided for treatment by extraction to remove calcium chloride in accordance with the present invention. Naturally, the solvent must be selected on the basis of its ability to selectively extract calcium chloride while extracting a minimal amount of $P_2O_5$ value.

For a better understanding of the present invention, reference is now had to the drawing, which is a diagrammatical representation of a flow plan for the continuous commercial production of diammonium phosphate from phosphate rock ore, nitric acid, and ammonia, in accordance with one embodiment of the process of the present invention.

For the purposes of this example, the phosphate ore employed as a starting material in the present process is Florida pebble rock having the analysis shown in Table I which is set out in the examples below. The phosphate ore is charged in line 10 to digester 16 at the rate of 36,000 pounds per hour on a continuous basis. Nitric acid is charged in line 12 to digester 16 for the purpose of acidulating the ore, the nitric acid being 60% by weight and being charged at the rate of 68,500 pounds per hour. Gas produced as a result of such acidulation is vented as shown. The acidic liquor produced in digester 16 is passed in line 17 to silica removal zone 18 wherein silica and other insoluble materials are separated from the acidic liquor by a suitable separation method and means. The acidic liquor from silica removal zone 18 is then passed in line 19 to a second digestion zone 20 wherein the $N_2O_5/P_2O_5$ ratio is adjusted in order to produce a paste of slurry containing monobasic calcium phosphate and calcium nitrate. For this purpose, phosphatic material constituted mainly by dibasic calcium phosphate is introduced to the second digester 20 at the rate of 23,600 pounds per hour in line 21. The resulting slurry from second digester 20 is conveyed in conduit 22 to extraction zone 24 wherein acetone at the rate of 280,000 pounds per hour is employed as a solvent to leach calcium nitrate from the slurry. The extract phase containing calcium nitrate is withdrawn from the extraction zone in line 25 and passed to another portion of the process for further treatment which is described below. Purified monobasic calcium phosphate is withdrawn from extraction zone 24 in line 26 and passed to ammoniation zone 28. Ammonia is introduced in lines 14 and 15 to ammoniation zone 28 at the rate of 6080 pounds per hour. Water is likewise introduced as shown in line 31 for the purpose of dissolving diammonium phosphate which is produced in the ammonation reaction. A mixture containing dissolved diammonium phosphate and solid dibasic calcium phosphate is passed from ammoniation zone 28 in line 30 to filtration zone 32 wherein the dibasic calcium phosphate is separated from the filtrate and recycled in line 21 to second digester 20 for further acidulation. The filtrate which contains the dissolved diammonium phosphate is passed in line 34 to drying zone 36 wherein, by the application of heat, water is driven off from the diammonium phosphate; and the dried and purified diammonium phosphate is recovered as a product in line 38.

Returning now to the treatment of the extract phase withdrawn in line 25 from the extraction zone 24, such extract is treated in order to recover the nitrate values which are contained therein. For this reason, the extract phase is treated in ammoniation-carbonation zone 27 with ammonia from lines 14 and 17 and carbon dioxide from line 35 to effect the following reaction:

(8) $Ca(NO_3)_2 + 2NH_3 + CO_2 + H_2O \rightarrow CaCO_3 + 2NH_4NO_3$

The resulting slurry from zone 27 is passed by means of conduit 29 to a solvent recovery zone 31 in which the slurry is stripped of solvent. Such solvent is recycled by means of line 33 for re-use in extraction zone 24. Additional solvent is added as required to make up for that which is lost. The stripped aqueous slurry is passed in line 41 to drying zone 43 wherein by the application of heat or other suitable drying method a nitrochalk fertilizer product is produced and withdrawn in line 45. As one alternative, the calcium carbonate, which is produced as a result of the carbonation in zone 27, can be filtered off prior to the drying step such that substantially pure ammonium nitrate is recovered as a product.

Having thus described the invention in general terms, reference is now had to specific examples which have been carried out in accordance with the process of the present invention. In the following examples, reference is made to two different phosphate rock ores denoted as Florida pebble rock or Tennessee rock ore, the respective analyses of which are set out in Table I.

TABLE I.—ANALYSIS OF PHOSPHATE ROCK

| Percent | Florida pebble rock | Tennessee rock (Generally low grade) |
|---|---|---|
| CaO | 45.8 | 23.9 |
| $P_2O_5$ | 31.4 | 18.8 |
| $SiO_2$ | 7.4 | 39.0 |
| F | 3.7 | 2.1 |
| $Al_2O_3$ | 0.8 | 4.6 |
| $Fe_2O_3$ | 1.1 | 3.0 |

*Example 1*

In this example, 100 gm. of Florida pebble rock ore having the analysis shown in Table I was calcined at 1800° F. for two hours and then acidulated with 60% aqueous $HNO_3$ which contained 104 gm. of $HNO_3$. Silica and other insoluble material was removed by filtration. The filtrate was mixed with 59.8 gm. of $CaHPO_4$, which was recycled from a subsequent step in the process; and the mixture was stirred until it attained the consistency of a thick paste. 424 gm. of acetone was mixed with the paste-like mixture and the calcium nitrate formed in the above-mentioned acidulation step was removed in the extract phase. The residue was stripped of solvent and treated with aqueous $NH_3$ at room temperature. The resultant slurry was filtered. The filter cake being pure $CaHPO_4$, was dried and recycled, as mentioned above. The filtrate containing diammonium phosphate was stripped of water. The yield of diammonium phosphate was 40.8 gm. in this example.

*Example 2*

The process described in Example 1 was carried out using Florida pebble rock as the starting material except that the rock was not calcined prior to acidulation and that methanol in the amount of 283 gm. was used as the solvent for the removal of calcium nitrate. The yield of diammonium phosphate in this example was 30.4 gm.

*Example 3*

In this example, 100 gm. of a low grade Tennessee phosphate rock ore having the analysis shown in Table I was decomposed with 60% aqueous $HNO_3$ which contained 54 gm. of $HNO_3$. Silica and other insoluble material was removed by filtration. The filtrate was then mixed with 27.2 gm. of recycled $CaHPO_4$ and the mixture was stirred until it attained a consistency of a thick paste. To the paste-like mixture was added acetone solvent in the amount of 424 gm. The calcium nitrate formed in the acidulation step was removed in the extract phase. The residue was then stripped of solvent and treated with aqueous ammonia which contained 15.1 gm. of $NH_3$ at room temperature. The resultant slurry was filtered. The filter cake which consisted of pure $CaHPO_4$ was dried and recycled and the filtrate containing diammonium phosphate was stripped of water. The yield of diammonium phosphate was 13.7 gm.

*Example 4*

The process was performed as described in Example 3 with the exception that methanol in the amount of 212 gm. was used as the solvent to extract the calcium nitrate. The yield of diammonium phosphate was 8.6 gm. in this example.

*Example 5*

The acetone extract obtained from the extraction performed in Example 1 is treated first with 28 gm. of gaseous $NH_3$ followed by a treatment with 36 gm. of gaseous $CO_2$ whereupon 82 gm. of calcium carbonate precipitates. The calcium carbonate is removed by filtration and the filtrate containing $NH_4NO_3$ is stripped of solvent and yields 131 gm. of $NH_4NO_3$.

*Example 6*

The acetone extract is obtained from the process in Example 1 containing co-extracted $H_3PO_4$ in an undetermined quantity is treated with gaseous $NH_3$ until precipitation of $CaHPO_4$ is completed. The $CaHPO_4$ is removed by filtration, dried and recycled for further acidulation. The filtrate is then treated with gaseous $NH_3$ and $CO_2$ in the manner described in Example 5. The yield of $NH_4NO_3$ is 131 gm.

*Example 7*

The process as described in either Example 5 or Example 6 is repeated with the exception that the final slurry contains $CaCO_3$ and dissolved $NH_4NO_3$ without first removing the calcium carbonate in order to yield a nitrochalk mixture as the final product.

*Example 8*

In this example, 100 gm. of Florida pebble rock having the analysis shown in Table I is decomposed by 50% aqueous nitric acid containing 75.6 gm. of $HNO_3$. The reaction mixture is treated with 500 gm. of acetone to remove the calcium nitrate formed as a result of the acidulation in the extract phase. The residue is dried and consists of 760 gm. of concentrated superphosphate (monobasic calcium phosphate).

*Example 9*

The mixture containing 31.0 gm. of tricalcium phosphate $(Ca_3PO_4)_2$ and 27.2 gm. of $CaHPO_4$ was acidulated with 50% nitric acid containing 37.8 gm. of $HNO_3$. To the resulting mixture was added 120 gm. of 95% ethanol thereby forming an extract phase which contained 12.8 gm. of $Ca(NO_3)_2$ and 7.1 gm. of phosphoric acid was co-extracted.

Many modifications and alterations of the above-described invention will become apparent to those skilled in the art, however, the scope of this invention should not be unduly restricted and is limited only by the claims.

What is claimed is:

1. A method for upgrading calcium-containing phosphatic material which comprises: admixing calcium-containing phosphatic material and nitric acid to obtain phosphoric acid and siliceous material, separating the siliceous material from the phosphoric acid, admixing additional calcium-containing phosphatic material with the mixture such that a slurry is obtained containing calcium nitrate and monobasic calcium phosphate and such that the presence of free phosphoric acid is avoided, admixing a solvent selected from the group consisting of methanol, ethanol, isopropanol, acetone, and methyl ethyl ketone and said slurry thereby producing a bi-phase system consisting of a liquid extract phase and a solid phase, said liquid extract phase containing dissolved calcium nitrate and said solid phase containing monobasic calcium phosphate, separating said liquid extract phase and said solid phase thereby producing monobasic calcium phosphate purified by the removal of calcium nitrate.

2. A method for upgrading calcium-containing phosphatic material which comprises: admixing calcium-containing phosphatic material and nitric acid to obtain phosphoric acid and siliceous material, separating the siliceous material from the phosphoric acid, admixing additional calcium-containing phosphatic material with the mixture such that a slurry is obtained containing calcium nitrate and monobasic calcium phosphate and such that the presence of free phosphoric acid is avoided, admixing liquid ammonia and said slurry thereby producing a bi-phase system consisting of a liquid extract phase and a solid phase, said liquid extract phase containing dissolved calcium nitrate and said solid phase containing monobasic calcium phosphate, separating said liquid extract phase and said solid phase thereby producing monobasic calcium phosphate purified by the removal of calcium nitrate.

3. A method of preparing a superphosphate fertilizer compound which comprises: acidulating comminuted phosphate rock ore with nitric acid, the relative quantities being such that the mol ratio of $N_2O_5/P_2O$ is maintained at not more than $2+X$, where X represents the mols of CaO in excess of CaO originally present as a tribasic phosphate salt in the ore, thereby producing a slurry containing calcium nitrate and monobasic calcium phosphate and the presence of free phosphoric acid is avoided, admixing a solvent selected from the group consisting of methanol, ethanol, isopropanol, acetone, and methyl ethyl ketone and said slurry thereby producing a bi-phase system consisting of a liquid extract phase and a solid phase, said liquid extract phase containing dissolved calcium nitrate and said solid phase containing monobasic calcium phosphate, separating said liquid extract phase and said solid phase thereby producing substantially purified monobasic calcium phosphate.

4. A method of preparing diammonium phosphate fertilizer which comprises: acidulating phosphate rock ore with nitric acid to produce phosphoric acid and siliceous material, separating said siliceous material from the acid, adding dibasic calcium phosphate to said acid to produce an $N_2O_5/P_2O_5$ ratio such that a slurry containing monobasic calcium phosphate and calcium nitrate is obtained and such that the presence of free phosphoric acid is avoided, admixing a solvent selected from the group consisting of methanol, ethanol, isopropanol, acetone, and methyl ethyl ketone and said slurry thereby extracting said calcium nitrate into the resulting solvent phase, separating said solvent phase from said slurry, contacting said slurry with ammonia thereby producing a mixture containing diammonium phosphate and dibasic calcium phosphate, separating dibasic calcium phosphate from diammonium phosphate and recycling dibasic calcium phosphate for use as hereinabove defined.

5. The method of claim 4 in which said $N_2O_5/P_2O_5$ ratio produced by admixing dibasic calcium phosphate and the phosphoric acid produced in the acidulation step is not more than $1.5+X$, where X represents the mols of CaO in excess of CaO originally present in the ore.

6. The method of claim 4 in which said slurry separated from said solvent phase is contacted with aqueous ammonia thereby producing an equeous solution of diammonium phosphate and solid dibasic calcium phosphate, separating said aqueous solution of diammonium phosphate from said dibasic calcium phosphate, and introducing additional ammonia into such solution to obtain an $NH_3:P_2O_5$ ratio of at least about 4:1 thereby precipitating diammonium phosphate from said solution.

References Cited by the Examiner

UNITED STATES PATENTS

| | | | |
|---|---|---|---|
| 2,759,795 | 8/1956 | Archer | 23—109 |
| 2,767,045 | 10/1956 | McCullough | 23—109 |
| 2,849,280 | 8/1958 | LeBaron et al. | 71—39 |
| 2,885,265 | 5/1959 | Cunningham | 23—165 |
| 2,914,380 | 11/1959 | Vickery | 23—165 |

FOREIGN PATENTS 391,495  5/1933  Great Britain.

DONALL H. SYLVESTER, *Primary Examiner.*
ANTHONY SCIAMANNA, *Examiner.*